(12) United States Patent
Wan

(10) Patent No.: US 12,248,644 B2
(45) Date of Patent: Mar. 11, 2025

(54) CIRCUIT ARRANGEMENT FOR A TOUCH SENSOR

(71) Applicant: NXP B.V., Eindhoven (NL)

(72) Inventor: Chao Wan, Tianjin (CN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/347,599

(22) Filed: Jul. 6, 2023

(65) Prior Publication Data

US 2024/0012509 A1  Jan. 11, 2024

(30) Foreign Application Priority Data

Jul. 6, 2022 (CN) .......................... 202210799582.9

(51) Int. Cl.
*G06F 3/041* (2006.01)
*G06F 3/044* (2006.01)
*H03K 17/96* (2006.01)

(52) U.S. Cl.
CPC ...... *G06F 3/04166* (2019.05); *G06F 3/04164* (2019.05); *G06F 3/044* (2013.01); *G06F 3/0443* (2019.05)

(58) Field of Classification Search
None
See application file for complete search history.

(56) References Cited

U.S. PATENT DOCUMENTS

| 8,436,263 | B2 | 5/2013 | Kremin | |
|---|---|---|---|---|
| 9,612,686 | B2 | 4/2017 | Qiu et al. | |
| 11,086,443 | B1* | 8/2021 | Chang | G06F 3/04164 |
| 2006/0097991 | A1* | 5/2006 | Hotelling | G06F 3/04164 345/173 |
| 2006/0176077 | A1* | 8/2006 | Grabill | G06F 30/34 326/39 |
| 2011/0175847 | A1* | 7/2011 | Wang | G06F 3/04166 345/174 |
| 2012/0086656 | A1* | 4/2012 | Hung | G06F 3/041661 345/173 |
| 2012/0217981 | A1* | 8/2012 | Erdogan | G06F 3/044 324/679 |
| 2012/0313890 | A1* | 12/2012 | Mohindra | G06F 3/0446 345/174 |
| 2013/0222330 | A1* | 8/2013 | Kern | G06F 3/0416 345/174 |

(Continued)

*Primary Examiner* — Patrick N Edouard
*Assistant Examiner* — Peijie Shen

(57) ABSTRACT

A circuit arrangement for a touch sensor includes a plurality of capacitive sensors, an ADC, a switch arrangement, and a controller. The capacitive sensors measure over a respective sampling period for detecting a touch event on a surface and provide an output. The ADC receives the output and determines a digital value over a conversion period. The switch arrangement selectively provides the output from the capacitive sensors to the ADC. The controller activates a first capacitive sensor to measure the capacitance for detecting a touch event, and activates a second capacitive sensor for detecting a touch event such that the respective sampling periods are at least partly concurrent. The controller also controls the switch arrangement to cause the ADC to receive the output of the first capacitive sensor after its sampling time and receive the output of the second capacitive sensor after its sampling time.

19 Claims, 7 Drawing Sheets

(56) References Cited

U.S. PATENT DOCUMENTS

| | | | |
|---|---|---|---|
| 2014/0176496 A1* | 6/2014 | Azumi | G06F 3/0445 |
| | | | 345/174 |
| 2015/0338952 A1* | 11/2015 | Shahparnia | G06F 3/0443 |
| | | | 345/174 |
| 2018/0260075 A1 | 9/2018 | Lai et al. | |
| 2020/0103981 A1* | 4/2020 | Hsu | G06F 3/0202 |
| 2020/0210044 A1* | 7/2020 | Kim | G06F 3/044 |
| 2022/0019331 A1* | 1/2022 | Park | G06F 3/04184 |
| 2022/0171517 A1* | 6/2022 | Oh | G06F 3/0446 |
| 2023/0084559 A1* | 3/2023 | Choi | G06F 3/04162 |
| | | | 345/174 |
| 2023/0325028 A1* | 10/2023 | Uchino | G06F 3/0418 |

* cited by examiner

CIRCUIT ARRANGEMENT FOR A TOUCH SENSOR

CROSS-REFERENCE TO RELATED APPLICATIONS

This application claims the priority under 35 U.S.C. § 119 to Chinese patent application no. 202210799582.9, filed 6 Jul. 2022, the contents of which are incorporated by reference herein.

FIELD

The present disclosure relates to a circuit arrangement for a touch sensor. In particular, it relates to a circuit arrangement configured to determine the capacitance of a plurality of distinct regions of a surface for determining the occurrence of a touch event. It also relates to a corresponding method.

BACKGROUND

A circuit for a touch sensor is used for detecting, for example, a human touch event on a surface. The detection of a touch event may be dependent on many non-ideal factors, such as, the strength of the touch, noise, electromagnetic interference or just someone passing by the surface. In some examples, a circuit may be configured to "scan" the surface several times to verify the presence of a touch input, wherein an average of all the scan results is taken to determine if the touch event occurred. Each scan may be filtered for robustness.

SUMMARY

According to a first aspect of the present disclosure there is provided a circuit arrangement for a touch sensor comprising:
  a plurality of capacitive sensors, wherein each capacitive sensor is configured to measure a capacitance over a respective sampling period for detecting a touch event on at least part of a surface and provide an output representative of said capacitance;
  an analog to digital converter, ADC, configured to receive the output of each of the capacitive sensors and determine a digital value over a conversion period;
  a controller;
  a first switch arrangement configured to selectively provide the output from the plurality of capacitive sensors to the ADC;
  wherein the controller is configured to:
  activate a first of the plurality of the capacitive sensors to measure the capacitance for detecting a touch event at a distinct region of the surface and activate a second of the plurality of the capacitive sensors to measure the capacitance for detecting a touch event at a different distinct region of the surface such that the respective sampling periods are at least partly concurrent, and wherein the controller is configured to control the first switch arrangement to cause the ADC to receive the output of the first capacitive sensor after its sampling time and to control the first switch arrangement to cause the ADC to receive the output of the second capacitive sensor after its sampling time.

In one or more examples, the circuit arrangement is configured to couple to a surface having a plurality of electrodes distributed thereover and from which the capacitive sensors can measure a capacitance of the surface subjected to touch events.

In one or more embodiments, the controller is configured to control the first switch arrangement to cause the first capacitive sensor to provide its output to the ADC for determination, by the ADC, of the digital value corresponding to the output of the first capacitive sensor during the sampling period of the second capacitive sensor.

In one or more embodiments, the controller is configured to activate the second capacitive sensor to initiate the measuring of the capacitance a time period after said activation of the first capacitive sensor to initiate the measuring of the capacitance, wherein the time period is greater than or equal to the conversion period.

In one or more embodiments, each of the plurality of capacitive sensors are configured to provide a sampling-period-complete signal to the controller to indicate when the respective sampling period is complete and that the capacitive sensor is ready to provide its output to the ADC and wherein the controller is configured to control the first switch arrangement to cause the plurality of capacitive sensors to provide their output to the ADC in an order corresponding to an order in which sampling-period-complete signals are received from the plurality of capacitive sensors.

In one or more embodiments, the circuit comprises a second switch arrangement configured to selectively couple each of the plurality of capacitive sensors to a plurality of distinct regions on the surface; and
  wherein activation of the first capacitive sensor includes controlling the second switch arrangement to couple the first capacitive sensor to any one of at least a first subset of the plurality of distinct regions for detection of an occurrence of a touch event at the distinct region to which the first capacitive sensor is coupled by the second switch arrangement; and
  wherein activation of the second capacitive sensor includes controlling the second switch arrangement to couple the second capacitive sensor to any one of at least a second subset of the plurality of distinct regions for detection of an occurrence of a touch event at the distinct region to which the second capacitive sensor is coupled by the second switch arrangement.

In one or more embodiments, each of the plurality of capacitive sensors are configured to detect the touch event at the surface which is divided into a plurality of user-input keys, wherein the plurality of distinct regions correspond to different user-input keys.

In one or more embodiments, the controller is configured to receive an idle signal from each of the plurality of capacitive sensors that indicates when any one of the plurality of capacitive sensors has provided their output to the ADC and is idle and wherein the controller is configured to control the second switch arrangement to cause the capacitive sensors from which the idle signal was received to be coupled to a different one of the distinct regions and activated.

In one or more embodiments, the controller is configured to provide a scan mode and a touch-event-determination mode, wherein
  in the scan mode the controller is configured to control the second switch arrangement to couple each of the plurality of capacitive sensors to the plurality of distinct regions consecutively to identify a candidate distinct region of the plurality of distinct regions, the candidate distinct region having a measure of capacitance, as determined by the respective capacitive sensor coupled thereto and the ADC, above or below a threshold level; and wherein the touch-event-determination mode is activated only for candidate distinct regions identified in the scan mode and comprises controlling the capacitive sensor coupled to the candidate distinct region, the first switch arrangement and the ADC, to obtain a plurality of capacitance measurements for the candidate distinct region and wherein the controller is configured to provide an output to indicate the occurrence or non-occurrence of a touch event at the candidate distinct region based on said plurality of capacitance measurements obtained in the touch-event-determination mode.

In one or more embodiments, the controller is configured to return to the scan mode when:

the output to indicate the occurrence of the touch event at the candidate distinct region is provided; or the plurality of capacitance measurements for the candidate distinct region result in the controller not providing the output to indicate the occurrence of the touch event at the candidate distinct region.

In one or more embodiments, the controller being configured to obtain a plurality of capacitance measurements for the candidate distinct region comprises being configured to obtain at least four capacitance measurements and wherein provision of the output to indicate the occurrence of a touch event is provided only if the capacitance measured is above a touch-event-capacitance threshold for all of the at least four capacitance measurements or if an average of the capacitance over the at least four capacitance measurements is above the touch-event-capacitance threshold.

In one or more embodiments, in the scan mode, the number of consecutive capacitance measurements obtained by the ADC from one of the plurality of capacitive sensors coupled to a particular one of the distinct regions before the controller is configured to control the second switch arrangement to couple the one of the plurality of capacitive sensors to a different particular one of the distinct regions is less than the number of the plurality of capacitance measurements for the candidate distinct region in the touch-event-determination mode.

According to an aspect of the disclosure we provide a touch sensor comprising the circuit arrangement of the first aspect and a surface, the surface comprising a touch sensitive surface having a plurality of distinct regions thereon defining different user-input keys and to which the circuit arrangement is coupled.

According to an aspect of the disclosure we provide a method for performing by a controller of a circuit arrangement for a touch sensor, the circuit comprising:

a plurality of capacitive sensors, wherein each capacitive sensor is configured to measure a capacitance over a respective sampling period for detecting a touch event on at least part of a surface and provide an output representative of said capacitance;

an analog to digital converter, ADC, configured to receive the output of each of the capacitance sensors and determine a digital value over a conversion period;

a first switch arrangement configured to selectively provide the output from the plurality of capacitive sensors to the ADC;

wherein the method comprises:

activating a first of the plurality of the capacitive sensors to measure the capacitance for detecting a touch event at a distinct region of the surface;

activating a second of the plurality of the capacitive sensors to measure the capacitance for detecting a touch event on a different distinct region of the surface such that the respective sampling periods are at least partly concurrent; and controlling the first switch arrangement to cause the ADC to receive the output of the first capacitive sensor after its sampling time; and controlling the first switch arrangement to cause the ADC to receive the output of the second capacitive sensor after its sampling time.

In one or more embodiments, the method comprises:

controlling the first switch arrangement to cause the first capacitive sensor to provide its output to the ADC for determination, by the ADC, of the digital value corresponding to the output of the first capacitive sensor during the sampling period of the second capacitive sensor.

In one or more embodiments, the method comprises:

receiving, by the controller, a sampling-period-complete signal from the plurality of capacitive sensors indicative of when the respective sampling period is complete and that the capacitive sensor is ready to provide its output to the ADC; and controlling, by the controller, of the first switch arrangement to cause the plurality of capacitive sensors to provide their output to the ADC in an order corresponding to an order in which sampling-period-complete signals are received from the plurality of capacitive sensors.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The detection of a touch event at a touch sensitive surface may be challenging. The detection of a touch event may be hindered by non-ideal factors, such as the strength of the touch (e.g. very light or very heavy), noise, electromagnetic interference or just someone passing by the surface that causes a change in capacitance that can be detected at the surface. In some examples, a circuit may be configured to take numerous measurements before a touch event is declared to have occurred in order to mitigate against non-ideal factors, including the aforementioned examples. The need to take numerous measurements before determining the occurrence or non-occurrence of a touch event may, in some examples, result in a touch sensor, comprising the circuit and the surface, providing a slow response to a touch event.

The examples that follow disclose a circuit arrangement for a touch sensor. In particular, the examples show a circuit arrangement that is couplable to or configured to be part of a capacitive touch sensitive surface to thereby form a touch sensor. The circuit arrangement may be configured to determine the capacitance of a plurality of distinct regions of the common surface for determining the occurrence of a touch event. The touch event may comprise a finger or stylus physically contacting the surface or hovering within a predetermined proximity thereto. The touch event may comprise removal of the finger or stylus that is physically contacting the surface or hovering over it. Such touch events are typically detected for providing user-input to a device.

Figure 1:
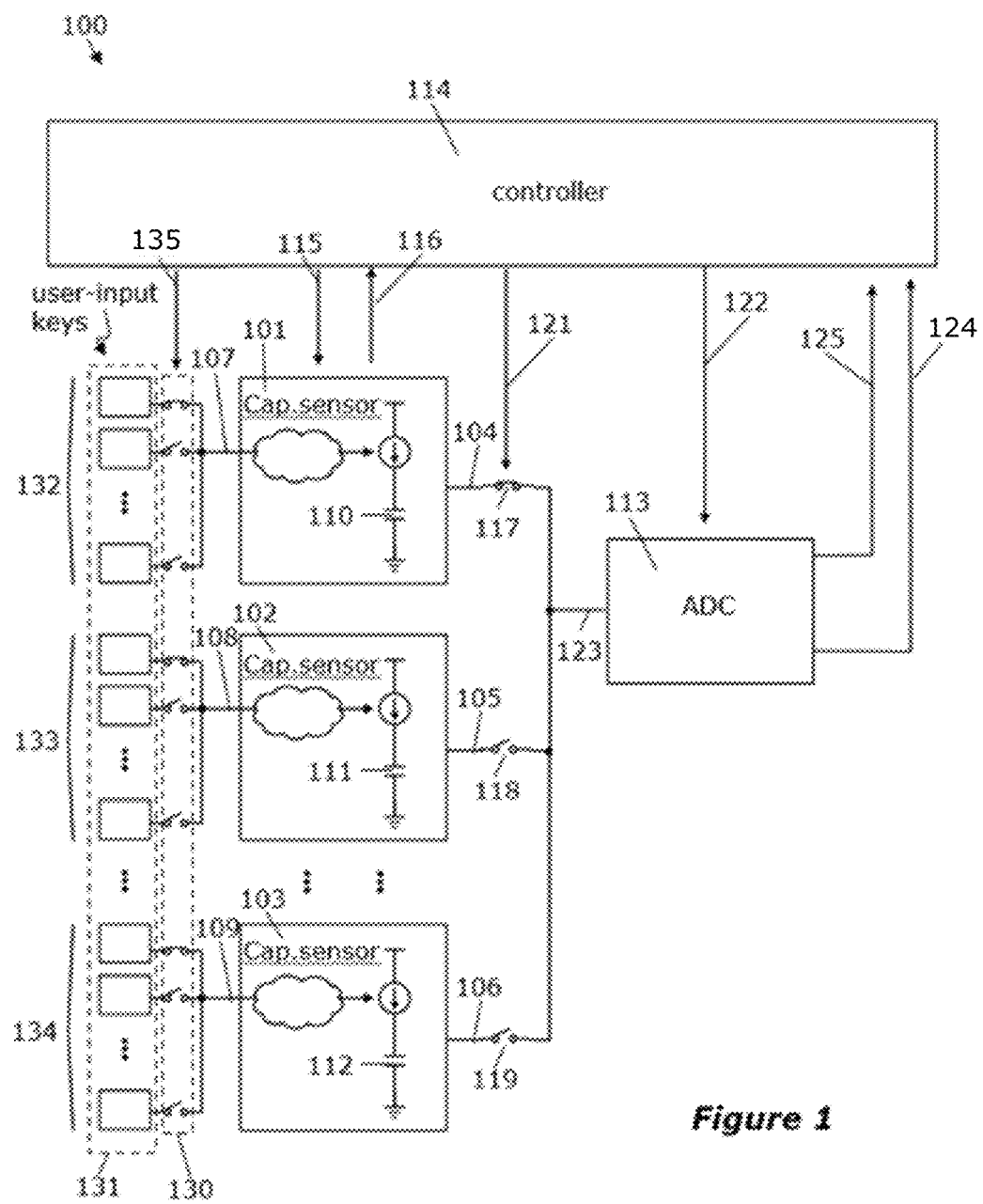
FIG. 1 shows an example embodiment of a circuit for a touch sensor.

FIG. 1 shows an example circuit arrangement 100 for a touch sensor. The circuit arrangement 100 is configured to couple to a surface that receives the touch events. Thus, the circuit arrangement 100 is configured to make capacitance measurements of the surface which is subject to influence from one or more touch events. The circuit arrangement 100 may be configured to determine the occurrence of a touch event and provide an output indicative of the occurrence of the touch event and, in some examples, an output indicative of where on the surface the touch event occurred. In other examples, the circuit arrangement may be configured to collect the capacitance measurement for a processor, wherein the processor makes the determination of whether the touch event occurred or not.

The circuit arrangement 100 comprises a plurality of capacitive sensors 101, 102, 103. In the present example three capacitive sensors are shown although in other examples, there may be at least two, at least three, at least four or more capacitive sensors. In general terms, there may be N capacitive sensors capable of and configured to provide independent and contemporaneous measurement of capacitance for the purpose of determining the occurrence of a touch event. Accordingly, the capacitive sensors may be coupled to distinct regions of the surface and the capacitance of those distinct regions will be influenced by the presence or absence of a finger or stylus or, more generally, a touch event.

Each capacitive sensor 101, 102, 103 is configured to measure a capacitance over a respective sampling period. The capacitance measured can be used by the circuit arrangement for detecting a touch event on at least part of the surface. Each capacitive sensor 101, 102, 103 is configured to provide an output representative of said capacitance, at a respective output terminal 104, 105, 106.

The capacitive sensors 101, 102, 103 are configured to be coupled to a part of the surface, i.e. distinct regions of the surface, by respective terminals 107, 108, 109. The construction of the capacitive sensors themselves is not the focus of this application. However, it will be appreciated that the capacitive sensors may be configured to apply a voltage to the distinct regions and that they each include an internal capacitor 110, 111, 112 to receive charge, wherein the flow of charge between the distinct regions of the surface and the capacitive sensor 101, 102, 103 is influenced by the presence of a touch event at the distinct region of the surface to which the respective capacitive sensor 101, 102, 103 is coupled (by terminals 107-109). Accordingly, the charge that accumulates on the internal capacitor 110, 111, 112 during the sampling period generates a voltage that may then be "read" by the circuit arrangement 100 and, as shown in this example, received by an analog to digital converter, ADC 113.

The circuit arrangement 100 further includes a controller 114 configured to control the operation of the circuit arrangement 100. The controller 114 may be configured to activate, individually, the capacitive sensors 101, 102, 103 by way of a control signal shown by arrow 115. The activating of one of the capacitive sensors 101, 102, 103 may comprise causing it to make a measurement of capacitance, such as for use in determining the occurrence of a touch event.

In some examples, the capacitive sensors 101, 102, 103 may be configured to signal to the controller (shown by arrow 116) that they have a capacitance measurement ready to provide to the ADC 113.

The circuit arrangement 100 comprises a first switch arrangement 117, 118, 119 configured to selectively provide the output from the plurality of capacitive sensors 101, 102, 103 to the ADC 113. The controller 114 may be configured to control the first switch arrangement 117, 118, 119 by a control signal shown by arrow 121.

The controller 114, in the present example, is configured to control the first switch arrangement 117, 118, 119 to couple the capacitive sensors 101, 102, 103 to the ADC 113 one at a time. The ADC 113 may then receive the output representative of said capacitance from each of output terminal 104, 105, 106 of the sensors 101, 102, 103 in turn and provide the analog to digital conversion sequentially. The first switch arrangement 117-119 in this example thus comprises a plurality of switches that control a connection between the sensors 101-103 and the ADC 113.

However, it will be appreciated that in other examples, the first switch arrangement 117, 118, 119 may not control a physical connection between the output terminals 104, 105, 106 and the ADC 113 and may instead control when the capacitive sensors 101, 102, 103 provide their output to the ADC 113. Other examples are possible.

The ADC 113 is configured to receive the output of each of the capacitance sensors and determine a digital value based on the output. The conversion process takes time comprising a conversion period. The controller 114 may also be configured to provide a control signal, shown by arrow 122, to the ADC to cause it to perform the analog to digital conversion based on the voltage presented at its input terminal 123 from the capacitive sensors 101, 102, 103.

In the present example, the provision of a plurality of capacitive sensors 101, 102, 103 in combination with a single ADC (or more generally fewer ADCs than capacitive sensors 101, 102, 103) may be advantageous. In one or more examples the sampling period is longer than the conversion period and therefore the circuit 100 may operate efficiently by acquiring capacitance measurements at least partly concurrently. The capacitive sensors 101, 102, 103 and the ADC 113 may then be used more time efficiently.

Thus, the controller 114 may be configured to activate a first 101 of the plurality of the capacitive sensors to measure the capacitance for detecting a touch event on the surface and activate a second 102 of the plurality of the capacitive sensors to measure the capacitance for detecting a touch event on a different region of the surface such that the respective sampling periods are at least partly concurrent. Thus, the first and second capacitive sensors 101, 102 may be activated by signal 115 at the same time to measure the capacitance of different distinct regions or parts of the surface to which the circuit 100 is to be coupled. The start of the respective sampling periods may be synchronised in some examples. In other examples, the start of the respective sampling periods may be staggered such that the sampling periods of some or all of the plurality of capacitive sensors 101, 102, 103 temporally overlap in part.

The controller 114, in this example, is configured to control the first switch arrangement 117 to couple the first capacitive sensor 101 to the ADC 113 such that the ADC receives the output of the first capacitive sensor 101 after its sampling time and to control the first switch arrangement 118 to couple the second capacitive sensor 102 to the ADC 113 such that the ADC 113 receives the output of the second capacitive sensor 102 after its sampling time. In some examples, the controller 114 may be configured to couple the first capacitive sensor 101 and the second capacitive sensor 102 based on an indication from the ADC that it is available for making an analog to digital conversion (e.g. the conversion period is not currently ongoing).

The ADC 113 is configured to output the digital representations of the capacitance measured by the capacitive sensors 101, 102, 103 at output 124. The output of the ADC 113 may be received by the controller 114 or another processor (not shown) for interpreting the capacitance measurements to determine the occurrence of the touch event and, in some examples, where on the surface the touch event occurred.

The ADC 113 may be configured to provide a signal, shown by output 125, to the controller 114 to indicate when the analog to digital conversion is complete, i.e. the end the end of the conversion period for a particular input.

Figure 2:
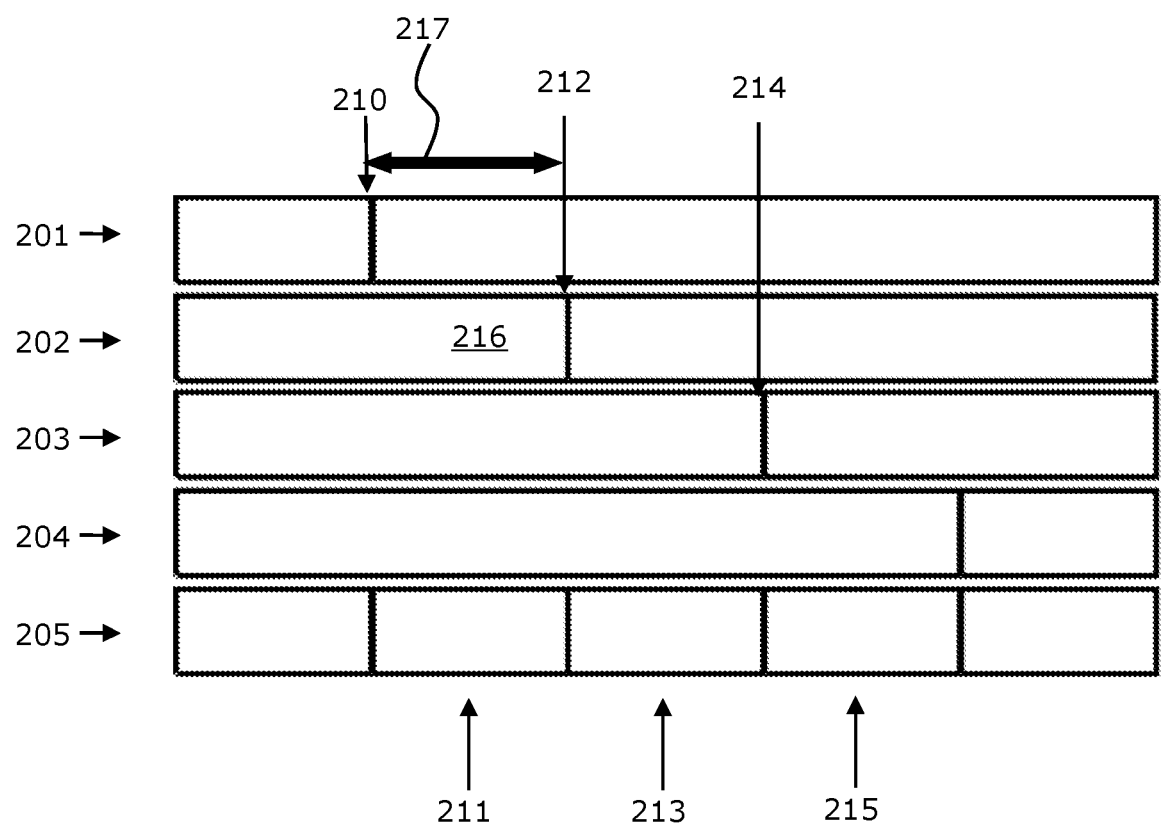
FIG. 2 shows an example timing diagram illustrating the operation of the circuit of FIG. 1.

FIG. 2 shows a timing diagram illustrating four capacitive sensors 101, 102, 103 and a further one (not shown in FIG. 1). A first row 201 shows consecutive sampling periods of the first capacitive sensor 101. A second row 202 shows the consecutive sampling periods of the second capacitive sensor 102. A third row 203 shows the sampling periods of the third capacitive sensor 103. A fourth row 204 shows the sampling periods of a fourth capacitive sensor. A fifth row 205 shows the conversion periods of the ADC 113.

A sampling period for the first capacitive sensor 101 ends at time 210. A subsequent sampling period then starts. At time 210, the first capacitive sensor 101 provides its output to the ADC 113 and period 211 comprises the conversion period for the output of the first capacitive sensor 101. At the end of period 211, the ADC is configured to output the digital representation of the capacitance measurement made by the first capacitance sensor 101 and is then ready to receive the next input. In this example, the next input comprises the output of the second capacitive sensor 202 at the end of sampling period 216.

The sampling period 216 for the second capacitive sensor 102 ends at time 212. A subsequent sampling period then starts. At time 212, the second capacitive sensor 102 provides its output to the ADC 113 and period 213 comprises the conversion period for the output of the second capacitive sensor 102.

Similarly, a sampling period for the third capacitive sensor 103 ends at time 214. A subsequent sampling period then starts. At time 214, the third capacitive sensor 103 provides its output to the ADC 113 and period 215 comprises the conversion period for the output of the third capacitive sensor 103 and so on for the fourth capacitive sensor.

Thus, in this example, the controller 114 is configured to control the first switch arrangement to couple the first capacitive sensor 101 to the ADC 113 and provide for determination, by the ADC, of the digital value corresponding to the output of the first capacitive sensor (i.e. during conversion period 211) during the sampling period 216 of the second capacitive sensor 102. In this example, the conversion period for the output of the first capacitive sensor 101 is provided wholly within the sampling period 216 of the second capacitive sensor. However, in other examples, there may be at least temporal overlap between the conversion period for one capacitive sensor and the sampling period of a different capacitive sensor.

The scheduling of the sampling periods and the conversion periods may provide for efficient operation. Thus, in one or more examples, the controller 114 may be configured to activate the second capacitive sensor 102 at time 212 to initiate the measuring of the capacitance after a time period 217. The time period 217 comprises a period after said activation of the first capacitive sensor at time 210 to initiate the measuring of the capacitance, wherein the time period is greater than or equal to the conversion period 211. In such an example, the ADC will be ready to receive the output of the plurality of capacitive sensors as they complete their sampling periods.

Thus, in some examples, the sampling periods and conversion periods may be predictable and consistent and the controller may operate to a schedule, as suggested by FIG. 2. The schedule may define the timing of the activation of the capacitive sensors and the activation of the ADC. In other examples, the controller 114 may operate such that it is reactive to the status of the capacitive sensors 101, 102, 103 and or ADC 113.

Thus, with reference to FIG. 1, each of the plurality of capacitive sensors 101-103 may be configured to provide a sampling-period-complete signal (shown generally by the arrow 116 in FIG. 1) to the controller 114 to indicate that the sampling period for that sensor 101-103 is complete. Accordingly, the capacitive sensor sending the sampling-period-complete signal is ready to provide its output to the ADC.

The controller may be configured to control the first switch arrangement 117-119 to couple the plurality of capacitive sensors to the ADC 113 in an order corresponding to an order in which sampling-period-complete signals are received from the plurality of capacitive sensors. Thus, the controller 114 may operate by the principle of first sampled, first converted by the ADC 113.

In some examples, each of the capacitive sensors 101, 102, 103 may be configured to determine the capacitance of a fixed, distinct region of the surface. Thus, the surface may be considered to comprise a plurality of user input keys and the capacitive sensors 101, 102, 103 each correspond to one of those keys. In other examples, one or more of the plurality of capacitive sensors 101, 102, 103 are configured to determine the capacitance for a plurality of distinct regions of the surface. Accordingly, the connection between any one of the capacitive sensors 101-103 and the plurality of distinct regions of the surface may be switched.

Thus, the circuit arrangement 100 may comprise a second switch arrangement 130 configured to selectively couple each of the plurality of capacitive sensors 101-103 to a plurality of distinct regions 131 on the surface. The plurality of boxes shown within box 131 in FIG. 1 represent the plurality of distinct regions or user-input keys presented on the surface for receiving user input.

The controller 114 may be configured to provide a control signal, represented by arrow 135, to control which distinct region each of the capacitive sensors 101-103 are coupled. It will be appreciated that the plurality of capacitive sensors 101-103 may be configured to be coupled to a different distinct region at any one time. In some examples, the distinct regions to which the first capacitive sensor 101 can be coupled comprises a different group of distinct regions compared to the distinct regions to which the second capacitive sensor 102 (or any other of the capacitive sensors) can be coupled. In other examples, there may be partial overlap between the groups. In some examples, each capacitive sensor may be couplable to any of the total number of distinct regions. In the present example, the distinct regions are unique to each group. Thus, first subset 132 of distinct regions or user-input keys are couplable only to the first capacitive sensor 101. The second subset 133 of distinct regions or user-input keys are couplable only to the second capacitive sensor 102. Likewise, the third subset 134 of distinct regions or user-input keys are couplable only to the third capacitive sensor 103.

Thus, the aforementioned activation of the first capacitive sensor 101 may include controlling the second switch arrangement 130 to couple the first capacitive sensor 101 to any one of at least a first subset 132 of the plurality of distinct regions for detection of an occurrence of a touch event at the distinct region to which the first capacitive sensor is coupled.

Likewise, the aforementioned activation of the second capacitive sensor 102 may include controlling the second switch arrangement 130 to couple the second capacitive sensor 102 to any one of at least a second subset 133 of the plurality of distinct regions for detection of an occurrence of a touch event at the distinct region to which the second capacitive sensor 102 is coupled by the second switch arrangement 130. Activation of the third capacitive sensor is similar relative to third subset 134. As mentioned, the distinct regions in the first subset may be exclusive thereto and the distinct regions in the second subset may be exclusive thereto. However, in other examples, there may be overlap between the distinct regions in each of the first and second subset 132, 133 and, likewise, the subset 134 for the third capacitive sensor 103 and so on.

As an example of implementation of the circuit arrangement, all of the distinct regions, which may correspond to the user-input keys to be detected, are divided into N groups, wherein N corresponds to the number of the plurality of capacitive sensors 101, 102, 103. Thus, in the example explicitly shown in FIG. 1, N=3.

Accordingly, each distinct region 131 or user-input key can be selectively connected to its own capacitive sensor 101, 102, 103, through the second switch arrangement 130.

The second switch arrangement 130 between any one distinct region and its capacitance sensor is controlled by the signal 135 generated by the controller 114. The control signal 135 may be implemented as an M×N bit bus array, where M comprises the number of distinct regions assigned to each capacitive sensor and N, as mentioned above, comprises the number of capacitive sensors 101-103.

The signal 115 may be provided as an N bit bus wherein each bit is configured to activate or enable one of the capacitive sensors 101-103 such that it measures the capacitance associated with the distinct region to which it is coupled.

The signal 116 may be provided to the controller 114 by way of an N bit bus, wherein each bit goes from one capacitive sensor 101-103 to the controller 114. For example, if any bit on this bus is logic 1, it may be configured to mean that the related capacitive sensor 101-103 has finished the electric charge integration process, as will be appreciated by those skilled in the art. The ADC 113 can then receive the output voltage from the respective capacitive sensor 101-103.

The signal 121 may be provided as an N bit bus configured to control each of the switches 117-119 of the first switch arrangement.

The controller 114 may be configured to check the bus signal 116, to determine if there is capacitive sensor 101-103 waiting to provide its output to the ADC 113. If there is, the controller 114 may be configured to enable the associated bit of the bus 121 to couple the appropriate capacitive sensor to the ADC by way of the first switch arrangement 117-119.

The signal 122 enables the ADC to begin the conversion.

The "conversion-complete" signal 125 from ADC 113 to the controller 114 indicates the ADC conversion period has completed and the ADC result is available. The controller 114 (or processor in other examples) then receives the output 124 and the controller 114 can store the ADC output, comprising a digital code, into a register.

The controller 114 may also be configured to control the second switch arrangement 130 to change the distinct region to which the capacitive sensor that has just provided its output to the ADC is coupled. In other examples, the capacitive sensor may determine the capacitance while coupled to the same distinct region a plurality of times. The process continues with the controller 114 selecting the next capacitive sensor that has provided the sampling-period-complete signal 116, and controlling the first switch arrangement 117, 118, 119 for coupling said next capacitive sensor to the ADC 113.

Figure 3:
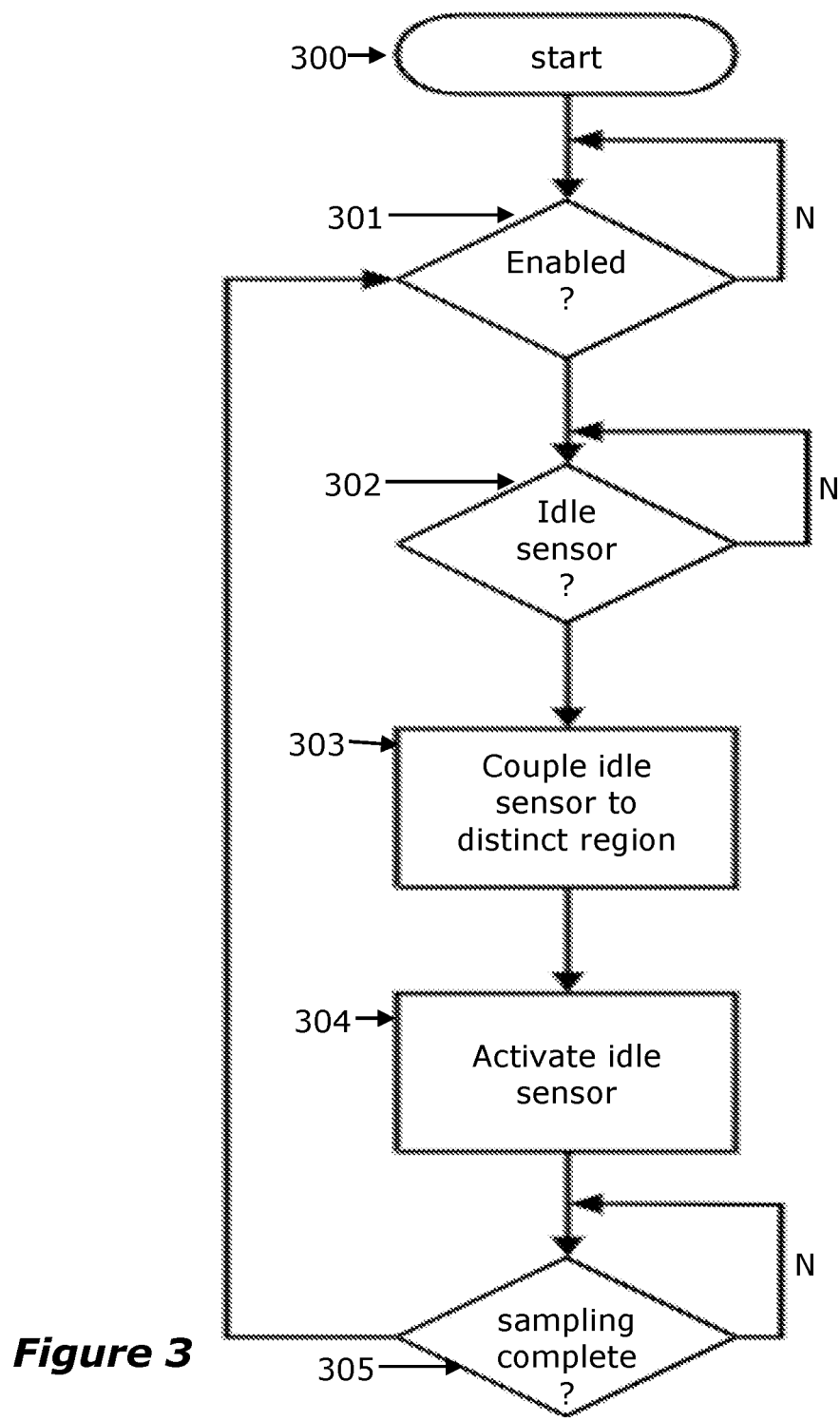
FIG. 3 shows an example method of operation of a capacitive sensor.

FIG. 3 shows an example method of operation for any one of the capacitive sensors 101-103. The method starts at 300. The controller determines at 301 whether the circuit 100 is enabled and, if not, returns to 301 and if so, proceeds to 302. Step 302 represents the controller determining if any of the capacitive sensors are idle, which in this example is performed by checking for the absence of the sampling-period-complete signal 116 from any of the capacitive sensors 101-103. If not, it continues checking. If so, the method proceeds to 303. Step 303 represents the controller 114 controlling the second switch arrangement 130 to couple the idle capacitive sensor 101-103 to a distinct region of the surface. It will be appreciated that the controller 114 may follow a predetermined scan scheme to determine the order in which the distinct regions are coupled to the capacitive sensors. Step 304 shows the controller 114 providing the signal 115 to activate the idle capacitive sensor and thereby begin the sampling period. Step 305 shows the controller 114 checking whether the sampling-period-complete signal 116 has been received so that the respective one of the capacitive sensors 101-103 can provide its output to the ADC 113.

Figure 4:
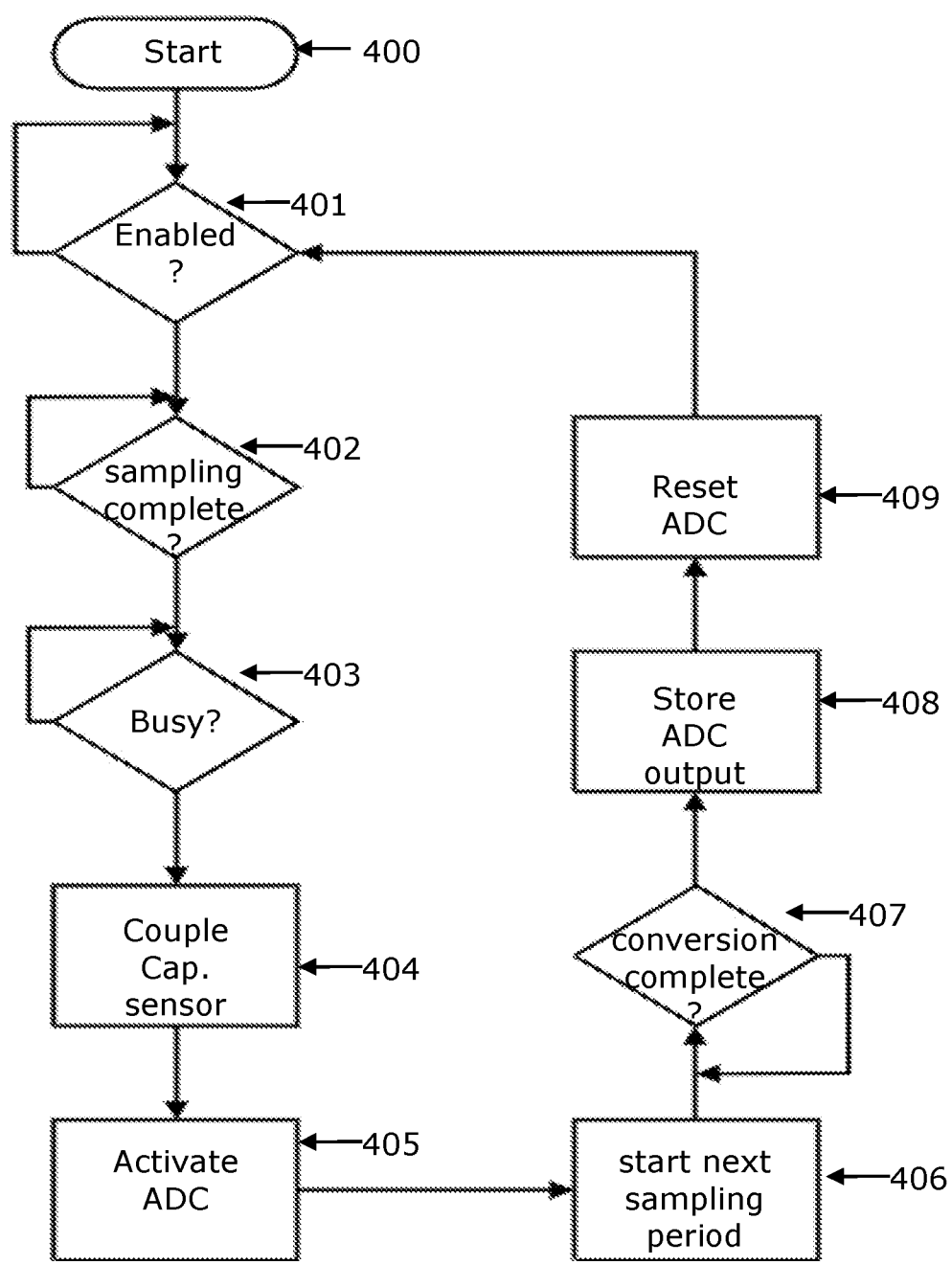
FIG. 4 shows an example method of operation of an analog-to-digital converter.

FIG. 4 shows an example method of operation for the ADC 113. The method starts at 400. The controller determines at 401 whether the circuit 100 is enabled and, if not, returns to 401 and if so, proceeds to step 402. At step 402 the method comprises determining if the controller 114 has received the sampling-period-complete signal 116 from any of the capacitive sensors 101-103. If not the method returns to 402. If so, the method proceeds to step 403 which checks if the ADC is already busy, i.e. the conversion period is pending. The method waits at 403 if the ADC is busy. The controller 114 moves to step 404 when the signal 125 indicates the ADC 113 is not currently enabled (and therefore ready for the next conversion). The controller 114 controls, by signal 121 and shown at step 404, the first switch arrangement 117-119 to couple the capacitive sensor 101-103 that reported its sampling-period-complete signal 116 in step 402 to the ADC 113. The ADC is then activated at step 405 to begin the analog to digital conversion of the output of the coupled capacitive sensor. The controller 114 then resets the capacitive sensor 101-103 such that it can then begin a subsequent sampling period at step 406. Step 407 shows the controller 114 waiting for the "conversion-complete" signal 125 such that when it is received the method proceeds to step 408. The controller 114 is configured to store the output of the ADC from output 124 in a digital register or memory. Step 409 shows the controller 114 resetting the ADC 113 such that it can perform the next conversion. The example method proceeds to step 401.

We will now describe a method provided by the controller 114 to determine the occurrence of a touch event based on the results output by the ADC 113 at output 124.

As mentioned previously, a touch sensitive surface to which the circuit arrangement 100 is configured to couple is a very noisy environment. Electromagnetic interference, power noise, people walking around and other factors change the capacitance of the distinct regions and therefore that of the user-input keys at those distinct regions. In some examples, a possible touch event is usually ignored unless the capacitance measurement is indicative of a touch event eight or more consecutive times. This method is robust but, in some examples, may lead to poor touch detection speed.

In one or more examples, the controller 114 may be configured to control the capacitive sensors 101-103, first switch arrangement 117-119, ADC 113 and second switch arrangement 130 such that the capacitive sensors 101-103 determine the capacitance associated with each distinct region a first number of consecutive times before the second switch arrangement 130 changes the distinct region to which the capacitive sensors 101-103 are coupled. The first number of consecutive times may be one, two or three times but is preferably one time. If the capacitance measured from one of the distinct regions is above a threshold level, then the controller 114 may be configured to provide for determination of a greater number of consecutive measurements of capacitance from that one distinct region. Accordingly, the controller 114 can thereby progress through the plurality of distinct regions 131 by coupling them to the capacitive sensors 101-103 at a higher rate because only if the threshold level is exceeded will the controller 114 then make the greater number of repeated capacitance measurements before the confirmation of whether or not a touch event occurred.

In the above example, the controller 114 is configured to make the greater number of measurements when the capacitance measured from one of the distinct regions is above the threshold level. However, in other examples, it will be appreciated that the making of the greater number of measurements may be triggered by a change in the measured capacitance being above a threshold level. In such an example, the possible beginning of a touch event and the possible end of a touch event may be robustly determined.

Thus, the controller 114 may be considered to provide a scan mode and a touch-event-determination mode. In the scan mode the controller 114 makes a single consecutive measurement of capacitance for each of the plurality of distinct regions before moving to a subsequent distinct region.

The measurements of capacitance in the scan mode do not result in determination of a touch event, only the switching to the touch-event-determination mode. In the touch-event-determination mode, the controller 114 may make a greater number of consecutive measurements for a particular distinct region to confirm whether or not a touch event has occurred at the particular distinct region.

Figure 5:
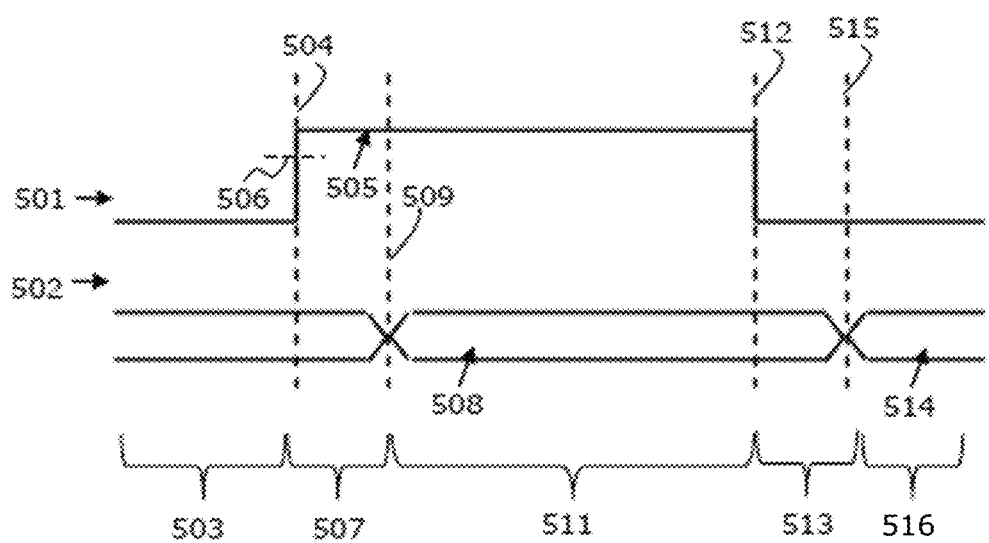
FIG. 5 shows an example method of operation of a scan mode and touch-event-determination mode.

FIG. 5 shows a timeline of operation. Line 501 shows the output of the ADC, which as explained is representative of the capacitance measured by the capacitive sensors 101-103 while coupled to the distinct regions 131. Line 502 shows the output of the controller 114 (or processor, not shown) in reporting the presence or absence of a touch event at a particular distinct region.

Thus, with reference to FIG. 1 and FIG. 5, in the scan mode 503 the controller 114 is configured to control the second switch arrangement 130 to consecutively couple the plurality of capacitive sensors 101-103 to the plurality of distinct regions 131 to identify a candidate distinct region of the plurality of distinct regions. The candidate distinct region is named as such because the measure of capacitance indicates that there may be a touch event but this cannot be confirmed in such a noisy environment. As shown in FIG. 5, it is not until time 504 that a candidate distinct region is identified. The candidate distinct region is identified as such because the measure of capacitance obtained during the scan mode, as determined by the respective capacitive sensor coupled thereto and the ADC, is above the threshold level, i.e. at level 505 above threshold level 506. The controller 114 then enters the touch-event-determination mode 507 for the candidate distinct region identified in the scan mode.

The touch-event-determination mode 507 comprises the controller 114 controlling the capacitive sensor 101-103 coupled to the candidate distinct region 131, the first switch arrangement 117-119 and the ADC 113, to obtain a plurality of capacitance measurements for the candidate distinct region. As mentioned, the number of capacitance measurements taken for the candidate distinct region is greater in number than the number of consecutive measurements taken from the distinct region in the scan mode.

In the example of FIG. 5, the ADC result 501 remains high during the plurality of consecutive capacitance measurements taken in the touch-event-determination mode 507. Thus, the controller 114 is configured to provide an output 508 at time 509 to indicate the occurrence of a touch event at the candidate distinct region based on said plurality of capacitance measurements. The number of consecutive capacitance measurements taken during the touch-event-determination mode 507 may be greater than four, greater than five, greater than six, greater than seven or more measurements.

Thus, the provision of the output 508 to indicate the occurrence of a touch event is provided only if the capacitance measured for the candidate distinct region is above a touch-event-capacitance threshold (which may be the same as level 506 or different) for all of the capacitance measurements taken during the touch-event-determination mode 507. In other examples, the controller may consider an average of the capacitance measurements associated with the candidate distinct region over the plurality of consecutive capacitance measurements and may determine whether the average is above the touch-event-capacitance threshold. It will be appreciated that other tests may be used to confirm the touch event in the touch-event-determination mode 507.

The controller 114 may be configured to return to the scan mode 511 when:
the output 508 to indicate the occurrence of the touch event at the candidate distinct region is provided; or
the plurality of capacitance measurements for the candidate distinct region result in the controller 114 not providing the output to indicate the occurrence of the touch event at the candidate distinct region (not shown in FIG. 5).

At time 512, the output from the ADC 113 shown by line 501 has crossed the threshold level 506. The controller 114, in response, may be configured to enter the touch-event-determination mode 513. In this example, the touch-event-determination mode 513 is configured to confirm a touch event comprising removal of the finger or stylus from the distinct region.

In the example of FIG. 5, the ADC result 501 remains low during the plurality of consecutive capacitance measurements taken in the touch-event-determination mode 513, such as below the touch-event-capacitance threshold (not shown) or whatever other test is used to confirm the touch event. Thus, the controller 114 is configured to provide an output 514 at time 515 to indicate the occurrence of a (removal of touch) touch event at the candidate distinct region based on said plurality of capacitance measurements. The controller 114 is then configured to return to the scan mode 516.

Thus, in the scan mode, the number of consecutive capacitance measurements obtained by the ADC from one of the plurality of capacitive sensors 101-103 coupled to each of the distinct regions before the controller is configured to control the second switch arrangement 130 to couple the one of the plurality of capacitive sensors to a different particular one of the distinct regions is less than the number of the plurality of capacitance measurements for the candidate distinct region in the touch-event-determination mode.

Figure 6:
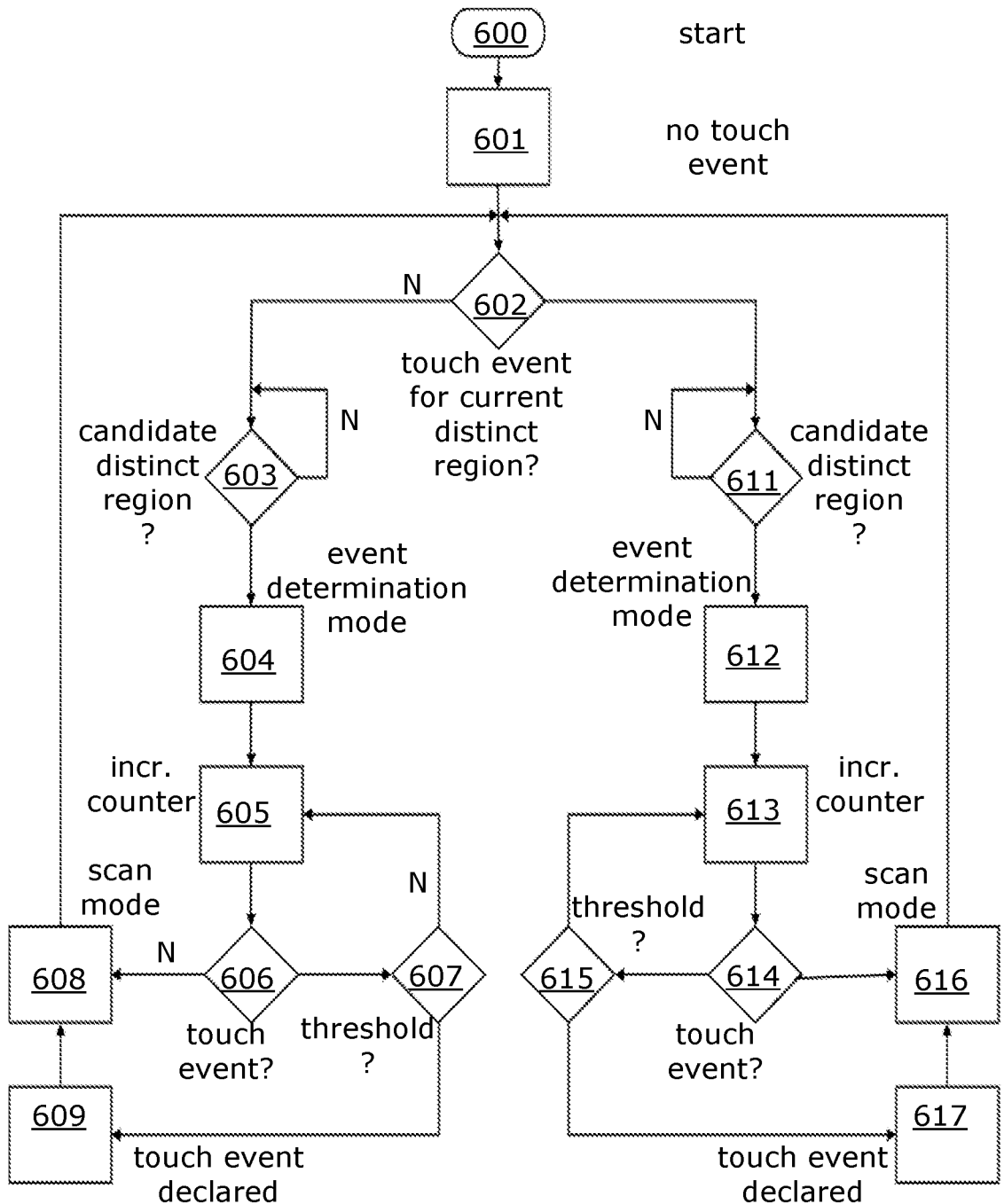
FIG. 6 shows an example flowchart illustrating the scan mode and touch-event-determination mode.

FIG. 6 shows an example mode of operation for each distinct region. The method provided by the controller 114 starts at 600. Step 601 shows no distinct region identified as currently experiencing a touch event. Step 602 comprises the controller determining, for a current distinct region, whether there is or is not a current touch event. If the current distinct region is not currently touched the method proceeds to 603. At 603 the controller is in the scan mode and it is configured to determine if the current distinct region is a candidate distinct region. If not, the method returns to step 603 for consideration next time the distinct region has its capacitance measured in the scan mode. If the current distinct region has a capacitance measurement above the threshold level 506 the method proceeds to step 604. At 604 the controller is configured to enter the touch-event-determination mode and therefore locks the first and second switch arrangements 117-119, 130 so that the capacitance of the same, current, distinct region can be measured numerous times. Step 605 comprises the incrementing of a possible-touch-event counter. Step 606 shows the controller evaluating whether or not the subsequently taken capacitance measurement is indicative of a possible touch event (whatever test that may involve). If it is, the method proceeds to step 607 which comprises a test to check whether the controller has determined the occurrence of a possible touch event eight or more times in a row (with reference to the possible-touch-event counter). If not, the method proceeds to step 605 in which the counter is incremented. The method then continues incrementing the possible-touch-event counter for as long as the controller determines a possible touch event based on consecutive capacitance measurements. When the possible-touch-event counter reaches eight (or whatever or other threshold count may be used) the method proceeds from step 607 to step 609 in which the controller declares the occurrence of a touch event. Step 608 comprises the controller being configured to enter the scan mode and therefore unlocks the first and second switch arrangements 117-119, 130 so that the controller can step through the distinct regions without the numerous measurement of each distinct region provided in the touch-event-determination mode. Similarly, if step 606 yields a capacitance measurement that is not indicative of a possible touch event, then the method also proceeds to step 608. The method then returns to step 602.

Steps 611-617 shows a similar method but for when the current distinct region is currently being touched. Thus, these steps are confirming when the touch input is removed from the distinct region.

At 611 the controller is in the scan mode and it is configured to determine if the current distinct region is a candidate distinct region but this time because the capacitance measurement differs from a previous measurement in a way that indicates a possible removal of the touch. If not, the method returns to step 611 for consideration next time the distinct region has its capacitance measured in the scan mode. If the current distinct region has a capacitance measurement below the threshold level 506 the method proceeds to step 612. At 612 the controller is configured to enter the touch-event-determination mode and therefore locks the first and second switch arrangements 117-119, 130 so that the capacitance of the same, current distinct region can be measured numerous times. Step 613 comprises the incrementing of a possible-touch-event counter, wherein in this branch of FIG. 6 the touch event is the removal of a touch from the distinct region. Step 614 shows the controller evaluating whether or not the capacitance measurement is indicative of a possible (non-)touch event (whatever test that may involve). If it is, the method proceeds to step 615 which comprises a test to check whether the controller has determined the occurrence of a possible (non-)touch event eight or more times in a row (with reference to the possible-touch-event counter). If not, the method proceeds to step 613 in which the counter is incremented. The method then continues incrementing the possible-touch-event counter for as long as the controller 114 determines a possible (non-)touch event based on consecutive capacitance measurements. When the possible-touch-event counter reaches eight (or whatever or other threshold count may be used) the method proceeds from step 615 to step 617 in which the controller declares the occurrence of a (non-)touch event. Step 616 comprises the controller being configured to enter the scan mode and therefore unlocks the first and second switch arrangements 117-119, 130 so that the controller can step through the distinct regions without the numerous measurements being made of each distinct region provided in the touch-event-determination mode. Similarly, if step 614 yields a capacitance measurement that is not indicative of a possible (non-)touch event, then the method also proceeds to step 616. The method then returns to step 602.

The circuit 100 of FIG. 1 may be provided in a form that is couplable to a surface having a plurality of distinct regions. In other examples, the circuit 100 may be provided in a form wherein the circuit arrangement 100 includes the surface, the surface comprising a touch sensitive surface having a plurality of distinct regions thereon defining different user-input keys and which are configured for coupling to the capacitive sensors 101-103 for having their capacitance measured. Accordingly, the surface may have a pattern of electrodes thereon that enable the capacitance of the one or more distinct regions to be measured.

Figure 7:
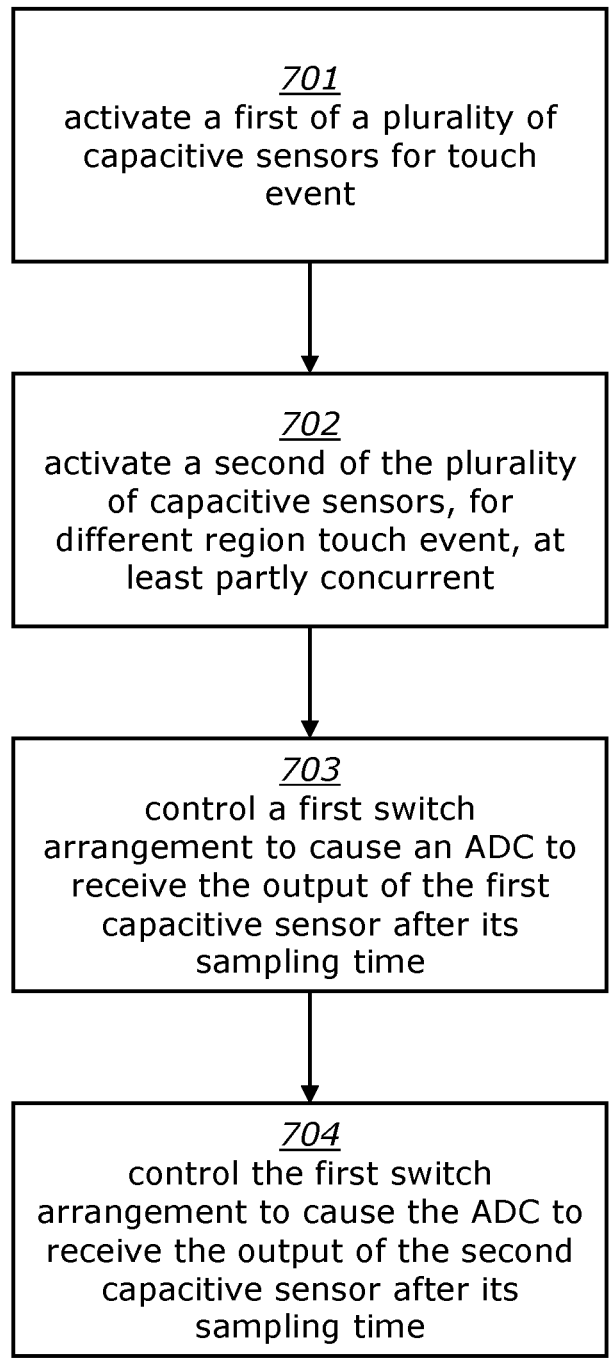
FIG. 7 shows an example method of operation.

FIG. 7 shows a further method, performed by a controller of a circuit for a touch sensor, the circuit comprising:
- a plurality of capacitive sensors, wherein each capacitive sensor is configured to measure a capacitance over a respective sampling period for detecting a touch event on at least part of a surface and provide an output representative of said capacitance;
- an analog to digital converter, ADC, configured to receive the output of each of the capacitance sensors and determine a digital value over a conversion period;
- a first switch arrangement configured to selectively provide the output from plurality of capacitive sensors to the ADC;
- wherein the method comprises:
  - activating 701 a first of the plurality of the capacitive sensors to measure the capacitance for detecting a touch event on the surface;
  - activating 702 a second of the plurality of the capacitive sensors to measure the capacitance for detecting a touch event on a different region of the surface such that the respective sampling periods are at least partly concurrent; and
  - controlling 703 the first switch arrangement to cause the ADC to receive the output of the first capacitive sensor after its sampling time and
  - controlling 704 the first switch arrangement to cause the ADC to receive the output of the second capacitive sensor after its sampling time.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A circuit arrangement for a touch sensor, the circuit arrangement comprising:
   - a plurality of capacitive sensors, including a first capacitive sensor and a second capacitive sensor, wherein each capacitive sensor is configured to measure a capacitance over a respective sampling period for detecting a touch event on at least part of a surface and provide an output representative of said capacitance, including providing a first output representative of a first capacitance measured by the first capacitive sensor over a first sampling period, and providing a second output representative of a second capacitance measured by the second capacitive sensor over a second sampling period;
   - an analog to digital converter (ADC) configured to receive the first output of the first capacitive sensor and determine a digital value based on the first output over a first conversion period for the first output, and to receive the second output of the second capacitive sensor and determine a digital value based on the second output over a second conversion period for the second output;
   - a controller;
   - a first switch arrangement configured to selectively provide the first output and the second output from the first and second capacitive sensors to the ADC; and
   - a second switch arrangement configured to selectively couple each of the plurality of capacitive sensors to a plurality of distinct regions on the surface,
   - wherein the controller is configured to provide a scan mode and a touch-event-determination mode, wherein:
     in the scan mode, the controller is configured to control the second switch arrangement to consecutively couple each of the plurality of capacitive sensors to a different one of the plurality of distinct regions, and to identify a candidate distinct region of the plurality of distinct regions, the candidate distinct region having a measure of capacitance, as determined by the respective capacitive sensor coupled thereto and the ADC, above or below a threshold level; and the touch-event-determination mode is activated after the scan mode for the candidate distinct region identified in the scan mode and includes controlling the capacitive sensor coupled to the candidate distinct region, the first switch arrangement, and the ADC, to obtain a first number of consecutive capacitance measurements for the candidate distinct region, and wherein the controller is configured to provide an output to indicate the occurrence or non-occurrence of a touch event at the candidate distinct region based on the first number of capacitance measurements obtained in the touch-event-determination mode.

2. The circuit arrangement of claim 1, wherein the controller is configured to control the first switch arrangement to cause the first capacitive sensor to provide the first output to the ADC for determination, by the ADC, of the digital value corresponding to the first output of the first capacitive sensor during the second sampling period of the second capacitive sensor.

3. The circuit arrangement of claim 1, wherein the controller is configured to
  activate the first capacitive sensor at a first time to measure the capacitance for detecting the touch event at the distinct region of the surface;
  activate the second capacitive sensor at a second time to measure the capacitance for detecting the touch event at the different distinct region of the surface, wherein the second time occurs a time period after the first time, and wherein the time period is greater than or equal to the first conversion period for the first output.

4. The circuit arrangement of claim 1, wherein each of the plurality of capacitive sensors is configured to provide a sampling-period-complete signal to the controller to indicate when the respective sampling period is complete and that the capacitive sensor is ready to provide its output to the ADC, and wherein the controller is configured to control the first switch arrangement to cause the plurality of capacitive sensors to provide their output to the ADC in an order corresponding to an order in which sampling-period-complete signals are received from the plurality of capacitive sensors.

5. The circuit arrangement of claim 1, wherein:
  activation of the first capacitive sensor includes controlling the second switch arrangement to couple the first capacitive sensor to any one of at least a first subset of the plurality of distinct regions for detection of an occurrence of a touch event at the distinct region to which the first capacitive sensor is coupled by the second switch arrangement; and
  activation of the second capacitive sensor includes controlling the second switch arrangement to couple the second capacitive sensor to any one of at least a second subset of the plurality of distinct regions for detection of an occurrence of a touch event at the distinct region to which the second capacitive sensor is coupled by the second switch arrangement.

6. The circuit arrangement of claim 5, wherein each of the plurality of capacitive sensors is configured to detect the touch event at the surface which is divided into a plurality of user-input keys, wherein the plurality of distinct regions corresponds to different user-input keys.

7. The circuit arrangement of claim 5, wherein the controller is configured to receive an idle signal from each of the plurality of capacitive sensors that indicates when any one of the plurality of capacitive sensors has provided their output to the ADC and is idle, and wherein the controller is configured to control the second switch arrangement to cause the capacitive sensors from which the idle signal was received to be coupled to a different one of the distinct regions and activated.

8. The circuit arrangement of claim 1, wherein:
  the controller is configured to return to the scan mode when
    the output is provided to indicate the occurrence of the touch event at the candidate distinct region; or
    the plurality of capacitance measurements for the candidate distinct region result in the controller not providing the output to indicate the occurrence of the touch event at the candidate distinct region.

9. The circuit arrangement of claim 1, wherein the controller being configured to obtain a plurality of capacitance measurements for the candidate distinct region comprises: the controller being configured to obtain at least four capacitance measurements, and wherein provision of the output to indicate the occurrence of a touch event is provided only if the capacitance measured is above a touch-event-capacitance threshold for all of the at least four capacitance measurements or if an average of the capacitance over the at least four capacitance measurements is above the touch-event-capacitance threshold.

10. The circuit arrangement of claim 1, wherein:
  in the scan mode, the first capacitive sensor performs a second number of consecutive capacitance measurements for a particular one of the distinct regions, and after the first capacitive sensor performs the second number of consecutive capacitance measurements, the controller is configured to control the second switch arrangement to couple the first capacitive sensor to a different particular one of the distinct regions, wherein the second number of consecutive capacitance measurements is less than the first number of consecutive capacitance measurements for the candidate distinct region in the touch-event-determination mode.

11. The circuit arrangement of claim 1, wherein the first switch arrangement is configured to control a physical connection between the output from the plurality of capacitive sensors and the ADC.

12. A method performed by a controller of a circuit arrangement for a touch sensor, the method comprising:
  activating a first capacitive sensor of a plurality of capacitive sensors to measure a first capacitance for detecting a touch event at a distinct region of a surface, wherein the first capacitive sensor is configured to measure the first capacitance over a first sampling period and provide a first output representative of the first capacitance;
  activating a second capacitive sensor of the plurality of the capacitive sensors to measure a second capacitance for detecting a touch event on a different distinct region of the surface, wherein the second capacitive sensor is configured to measure the second capacitance over a second sampling period and provide a second output representative of the second capacitance, and wherein the first and second sampling periods are at least partly concurrent;
  controlling a first switch arrangement, which is configured to selectively provide the first and second outputs from the first and second capacitive sensors to an analog to digital converter, ADC, to cause the ADC to receive the first output of the first capacitive sensor after the first sampling period, wherein the ADC is configured to receive the first output and determine a digital value based on the first output over a first conversion period for the first output;
controlling the first switch arrangement to cause the ADC to receive the second output of the second capacitive sensor after the second sampling period;
providing a scan mode in which the controller is configured to control a second switch arrangement to consecutively couple each of the plurality of capacitive sensors to a different one of a plurality of distinct regions, and to identify a candidate distinct region of the plurality of distinct regions, the candidate distinct region having a measure of capacitance, as determined by the respective capacitive sensor coupled thereto and the ADC, above or below a threshold level, and
providing a touch-event-determination mode after the scan mode, in which the controller is configured to control the capacitive sensor coupled to the candidate distinct region identified in the scan mode, the first switch arrangement, and the ADC, to obtain a first number of consecutive capacitance measurements for the candidate distinct region, and wherein the controller is configured to provide an output to indicate the occurrence or non-occurrence of a touch event at the candidate distinct region based on the first number of capacitance measurements obtained in the touch-event-determination mode.

13. The method of claim 12, further comprising:
controlling the first switch arrangement to cause the first capacitive sensor to provide the first output to the ADC for determination, by the ADC, of the digital value corresponding to the first output of the first capacitive sensor during the second sampling period of the second capacitive sensor.

14. The method of claim 12 further comprising:
receiving, by the controller, a sampling-period-complete signal from the plurality of capacitive sensors indicative of when the respective sampling period is complete and that the capacitive sensor is ready to provide its output to the ADC; and
controlling, by the controller, the first switch arrangement to cause the plurality of capacitive sensors to provide their output to the ADC in an order corresponding to an order in which sampling-period-complete signals are received from the plurality of capacitive sensors.

15. The method of claim 12, further comprising:
activating the first capacitive sensor at a first time to measure the capacitance for detecting the touch event at the distinct region of the surface; and
activating the second capacitive sensor at a second time to measure the capacitance for detecting the touch event at the different distinct region of the surface, wherein the second time occurs a time period after the first time, and wherein the time period is greater than or equal to the first conversion period for the first output.

16. The method of claim 12, wherein:
activating the first capacitive sensor includes controlling the second switch arrangement to couple the first capacitive sensor to any one of at least a first subset of the plurality of distinct regions for detection of an occurrence of a touch event at the distinct region to which the first capacitive sensor is coupled by the second switch arrangement; and
activating the second capacitive sensor includes controlling the second switch arrangement to couple the second capacitive sensor to any one of at least a second subset of the plurality of distinct regions for detection of an occurrence of a touch event at the distinct region to which the second capacitive sensor is coupled by the second switch arrangement.

17. The method of claim 16, further comprising:
receiving an idle signal from each of the plurality of capacitive sensors that indicates when any one of the plurality of capacitive sensors has provided their output to the ADC and is idle and controlling the second switch arrangement to cause the capacitive sensors from which the idle signal was received to be coupled to a different one of the distinct regions and activated.

18. A circuit arrangement for a touch sensor, the circuit arrangement comprising:
a plurality of capacitive sensors, including a first capacitive sensor and a second capacitive sensor, wherein each capacitive sensor is configured to measure a capacitance over a respective sampling period for detecting a touch event on at least part of a surface and provide an output representative of said capacitance, including providing a first output representative of a first capacitance measured by the first capacitive sensor over a first sampling period, and providing a second output representative of a second capacitance measured by the second capacitive sensor over a second sampling period;
an analog to digital converter (ADC) configured to receive the first output of the first capacitive sensor and determine a digital value based on the first output over a first conversion period for the first output, and to receive the second output of the second capacitive sensor and determine a digital value based on the second output over a second conversion period for the second output;
a controller;
a first switch arrangement configured to selectively provide the first output and the second output from the first and second capacitive sensors to the ADC; and
a second switch arrangement configured to selectively couple each of the plurality of capacitive sensors to a plurality of distinct regions on the surface,
wherein the controller is configured to
activate the first capacitive sensor to measure the capacitance for detecting a touch event at a distinct region of the surface during a first sampling period, and activate the second capacitive sensor to measure the capacitance for detecting a touch event at a different distinct region of the surface during a second sampling period, such that the first and second sampling periods are at least partly concurrent,
control the first switch arrangement to cause the ADC to receive the first output of the first capacitive sensor after the first sampling period,
control the first switch arrangement to cause the ADC to receive the second output of the second capacitive sensor after the second sampling period,
provide a scan mode in which the controller is configured to control the second switch arrangement to consecutively couple each of the plurality of capacitive sensors to a different one of the plurality of distinct regions, and to identify a candidate distinct region of the plurality of distinct regions, the candidate distinct region having a measure of capacitance, as determined by the respective capacitive sensor coupled thereto and the ADC, above or below a threshold level, and provide a touch-event-determination mode after the scan mode, in which the controller is configured to control the capacitive sensor coupled to the candidate distinct region identified in the scan mode, the first switch arrangement, and the ADC, to obtain a first number of consecutive capacitance measurements for the candidate distinct region, and wherein the controller is configured to provide an output to indicate the occurrence or non-occurrence of a touch event at the candidate distinct region based on the first number of capacitance measurements obtained in the touch-event-determination mode.

19. A touch sensor comprising:

a surface, the surface comprising a touch sensitive surface having a plurality of distinct regions thereon defining different user-input keys; and a circuit arrangement coupled to the surface, wherein the circuit arrangement includes a plurality of capacitive sensors, including a first capacitive sensor and a second capacitive sensor, wherein each capacitive sensor is configured to measure a capacitance over a respective sampling period for detecting a touch event on at least part of a surface and provide an output representative of said capacitance, including providing a first output representative of a first capacitance measured by the first capacitive sensor over a first sampling period, and providing a second output representative of a second capacitance measured by the second capacitive sensor over a second sampling period, an analog to digital converter (ADC) configured to receive the first output of the first capacitive sensor and determine a digital value based on the first output over a first conversion period for the first output, and to receive the second output of the second capacitive sensor and determine a digital value based on the second output over a second conversion period for the second output, a controller, a first switch arrangement configured to selectively provide the first output and the second output from the first and second capacitive sensors to the ADC, and a second switch arrangement configured to selectively couple each of the plurality of capacitive sensors to a plurality of distinct regions on the surface, wherein the controller is configured to activate the first capacitive sensor to measure the capacitance for detecting a touch event at a distinct region of the surface during a first sampling period, and activate the second capacitive sensor to measure the capacitance for detecting a touch event at a different distinct region of the surface during a second sampling period, such that the first and second sampling periods are at least partly concurrent, control the first switch arrangement to cause the ADC to receive the first output of the first capacitive sensor after the first sampling period, and control the first switch arrangement to cause the ADC to receive the second output of the second capacitive sensor after the second sampling period, provide a scan mode in which the controller is configured to control the second switch arrangement to consecutively couple each of the plurality of capacitive sensors to a different one of the plurality of distinct regions, and to identify a candidate distinct region of the plurality of distinct regions, the candidate distinct region having a measure of capacitance, as determined by the respective capacitive sensor coupled thereto and the ADC, above or below a threshold level, and provide a touch-event-determination mode after the scan mode, in which the controller is configured to control the capacitive sensor coupled to the candidate distinct region identified in the scan mode, the first switch arrangement, and the ADC, to obtain a first number of consecutive capacitance measurements for the candidate distinct region, and wherein the controller is configured to provide an output to indicate the occurrence or non-occurrence of a touch event at the candidate distinct region based on the first number of capacitance measurements obtained in the touch-event-determination mode.

* * * * *